(12) United States Patent
Subramanian

(10) Patent No.: US 12,189,500 B1
(45) Date of Patent: Jan. 7, 2025

(54) PREVENTING LOSS OF AUDIO DURING VEHICLE CALLS WHEN AUDIO BUS FAILS

(71) Applicant: GM Cruise Holdings LLC, San Francisco, CA (US)

(72) Inventor: Ramanathan Subramanian, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 35 days.

(21) Appl. No.: 18/341,449

(22) Filed: Jun. 26, 2023

(51) Int. Cl.
G06F 11/16 (2006.01)
G06F 11/07 (2006.01)
G06F 13/42 (2006.01)

(52) U.S. Cl.
CPC ...... *G06F 11/1616* (2013.01); *G06F 11/0757* (2013.01); *G06F 11/076* (2013.01); *G06F 13/4247* (2013.01)

(58) Field of Classification Search
CPC ............... G06F 11/076; G06F 11/0757; G06F 11/1616; G06F 13/4247
See application file for complete search history.

(56) References Cited

U.S. PATENT DOCUMENTS

2015/0292898 A1* 10/2015 Aldereguia ........ G01C 21/3469 701/410
2018/0033429 A1* 2/2018 Makke .................... G06F 3/167

* cited by examiner

*Primary Examiner* — Jigar P Patel

(57) ABSTRACT

Systems and methods for preventing loss of audio during calls to and from a vehicle. In particular, systems and methods are provided for preventing the loss of audio for calls during an audio bus failure. Vehicles include interior microphones and speakers, which are connected via an audio bus. In some examples, the audio bus also includes other components such as a mixer, a transceiver, one or more cellular modems, an audio input module, and a digital signal processor. Using the audio bus, microphone input is beam-formed and mixed and transmitted over a cellular network to a call recipient. Sound received back from the call recipient is received at the audio bus and transmitted to the vehicle via one or more speakers coupled to the audio bus. In some instances, the audio bus can fail, and alternative call procedures can be used to contact a remote advisor or other call recipient.

20 Claims, 8 Drawing Sheets

PREVENTING LOSS OF AUDIO DURING VEHICLE CALLS WHEN AUDIO BUS FAILS

BACKGROUND

1. Technical Field

The present disclosure generally relates to a vehicle primary audio bus and, more specifically, to preventing loss of audio during calls from the vehicle when the primary audio bus fails.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, ultrasonic sensors, inertial sensor module (ISM), acoustic sensors, amongst others. The sensors perceive the environment around the vehicles and collect massive data and measurements that the autonomous vehicle can use for operations such as control and navigation. The sensors can provide the data and measurements to an internal computing system of the autonomous vehicle, which can use the data and measurements to predict, plan and control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
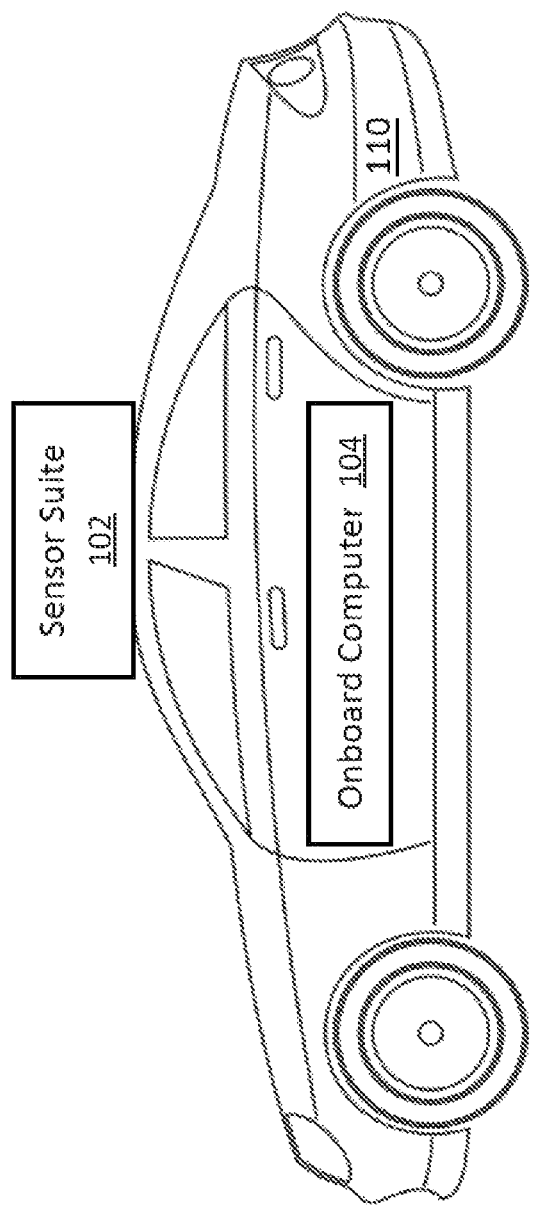
FIG. 1 illustrates an autonomous vehicle including a bus managing module for preventing audio loss during a call, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for preventing loss of audio during calls to and from a vehicle. In particular, systems and methods are provided for preventing the loss of audio for calls during an audio bus failure. Vehicles include interior microphones and speakers, which are connected via an audio bus. In some examples, the audio bus also includes other components such as a mixer, a transceiver, one or more cellular modems, an audio input module, and a digital signal processor. Using the audio bus, microphone input is beam-formed and mixed and transmitted over a cellular network to a call recipient (e.g., a remote advisor). Sound received back from the call recipient is received at the audio bus and played within the vehicle via one or more speakers coupled to the audio bus. However, in some instances, the audio bus can fail, and alternative call procedures can be used to contact a remote advisor or other call recipient. In various examples, a remote advisor is a remote person that can communicate with an autonomous vehicle and/or with a passenger in an autonomous vehicle. In some examples, a remote advisor can talk with a passenger if the passenger needs assistance or if there are any difficulties or problems with the vehicle. In some examples, a remote advisor can help get the autonomous vehicle moving if an issue arises and the autonomous vehicle stops.

In some embodiments, when a call transmitted on the audio bus in a vehicle fails, a remote advisor in contact with the vehicle can initiate a separate call via a vehicle cellular network to a speaker and microphone that are not connected to the audio bus. However, this process is initiated manually after call failure. The manual process can be prone to error, such as pressing the wrong button, and any delay can cause uneasiness to a passenger. It would be beneficial to automate the transition to a call on the non-audio bus system when call quality begins to falter and/or falls below a selected threshold.

Systems and methods are provided herein for automating the transfer of a call to a non-audio bus system when an audio bus failure is detected. In particular, a telemetrics and networking gateway (TANG) system on a chip (SOC) can be used to monitor for a fault on the audio bus and switch a call over to a back-up microphone that is not connected through the audio bus. In particular, TANG SOC includes a software driver that can monitor the audio bus for faults and detect faults in frames and/or superframes. When the driver detects an audio bus fault, the system switches the call to the back-up microphone and codec. In some examples, the TANG SOC includes a microphone and speaker manager that receives real-time commands to switch the audio source path from an audio bus to a back-up microphone. In some examples, the microphone and speaker manager can also receive real-time commands to switch the audio output path from an audio bus to a back-up speaker. In some examples, the microphone and speaker manager can select the audio source for the back-up speaker from two or more cellular input sources.

Example Vehicle Having an Audio Bus

FIG. 1 illustrates an autonomous vehicle 110 including a vehicle audio bus, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data.

The vehicle 110 includes an audio bus for audio communications. In various examples, the audio bus is a daisy-chained network bus, including multiple components as described in greater detail below. The vehicle 110 also includes a cellular modem for connecting to a remote assistant. In various implementations, the connection between the vehicle and the remote assistant can occur via the audio bus, such that microphones and speakers connected to the audio bus are used for audio communication with remote assistants. Additionally, the vehicle 110 includes a non-bus microphone and a non-bus speaker connected to the cellular modem, and the connection between the vehicle and the remote assistant can occur directly with the non-bus microphone and non-bus speaker, such that the audio bus is not needed for the communication. According to some examples, the vehicle 110 includes a fault detection module configured to detect an audio bus fault and route audio connections and/or calls to the non-bus microphone and non-bus speaker.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as locations of roadside shelters. Additionally, sensor suite 102 data can provide localized traffic information, ongoing road work information, and current road condition information. Furthermore, sensor suite 102 data can provide current environmental information, including current roadside environment information, such as the presence of people, crowds, and/or objects on a roadside or sidewalk. In this way, sensor suite 102 data from many autonomous vehicles can continually provide feedback to the mapping system and a high fidelity map can be updated as more and more information is gathered. In some examples, the sensor suite 102 can identify emergency personnel at or around the vehicle 110.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Vehicle Audio Bus

Figure 2:
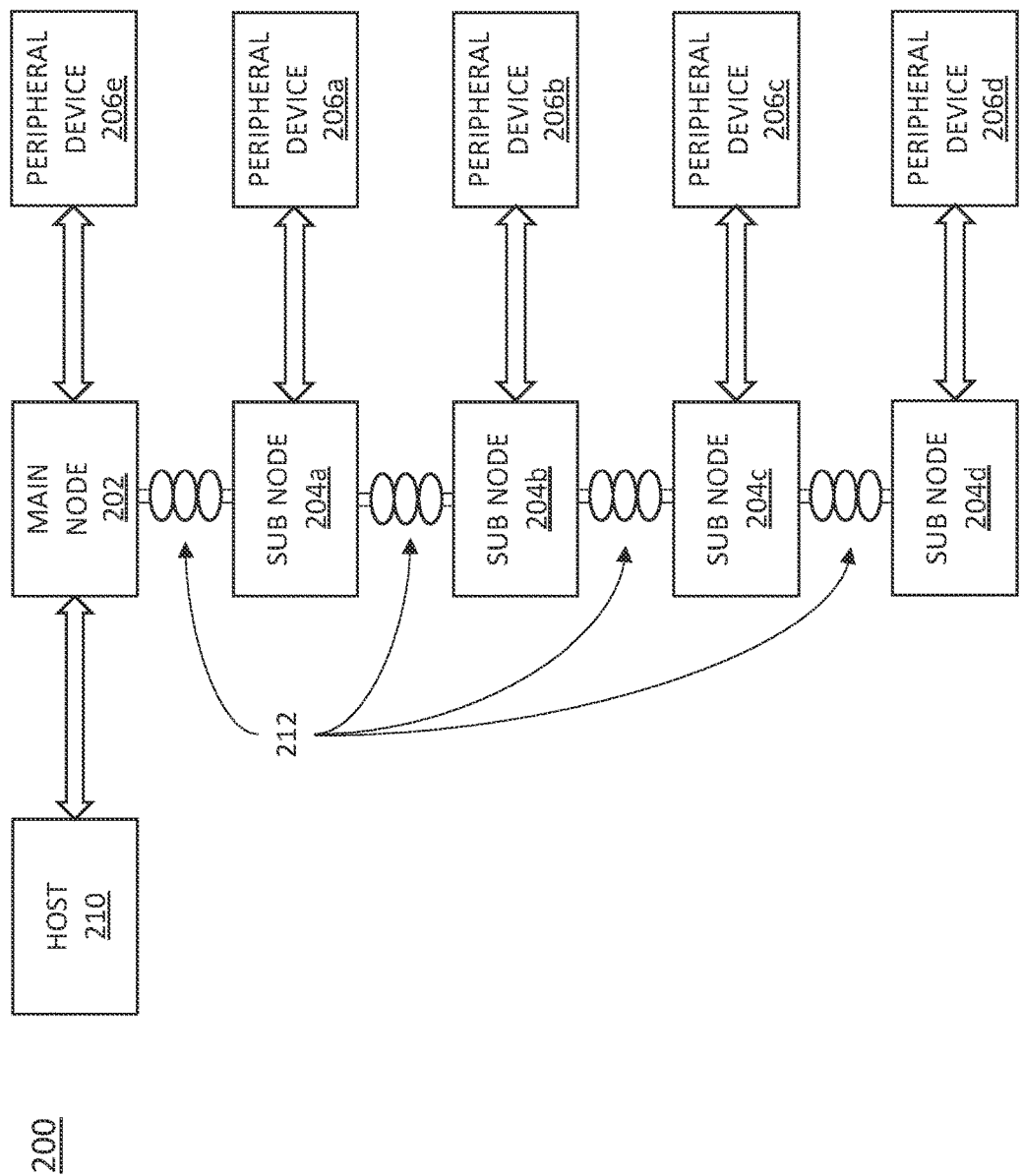
FIG. 2 is a block diagram of an illustrative two-wire daisy-chained communication system, in accordance with various embodiments according to some examples of the present disclosure.

FIG. 2 is a block diagram of an illustrative two-wire communication system 200, according to various examples of the present disclosure. The system 200 includes a host 210, a main node 202 and at least one sub node 204a. In FIG. 2, three sub nodes 204a-204c are illustrated, but in various examples, the system 200 can include one sub node 204a, two sub nodes 204a, 204b, or more than three sub nodes.

The main node 202 can communicate with the sub nodes 204a-204d over a two-wire bus 212. The bus 212 can include various two-wire bus links between adjacent nodes 202, 204a-204c to connect the nodes 202, 204a-204d along the bus 212 in a daisy-chain fashion. For example, the bus 212 can include a link coupling the main node 202 to the sub node 204a, a link coupling the sub node 204a to the sub node 204b, a link coupling the sub node 204b to the sub node 204c, and a link coupling the sub node 204c to the sub node 204d. In some examples, the links of the bus 212 may each be formed of a single twisted-wire pair. In some examples, the links of the bus 212 may each be formed of a coaxial cable. The two-wire bus links together provide a complete electrical path (e.g., a forward path and a return path).

The host 210 may include a processor that programs the main node 202, and acts as the originator and recipient of various payloads transmitted along the bus 212. The host 210 may be or may include a microcontroller, for example. The host 210 may be the master of Inter-Integrated Circuit Sound (I2S) communications that happen along the bus 212. The host 210 may communicate with the main node 102-1 via an I2S/Time Division Multiplex (TDM) protocol, a Serial Peripheral Interface (SPI) protocol, and/or an Inter-Integrated Circuit (I2C) protocol. The main node 202 may be programmable by the host 210 over the I2C bus for configuration and read-back, and may be configured to generate clock, synchronization, and framing for all of the sub nodes 204a-204d. In some embodiments, the host 210 can used an I2C control bus to access registers and status information for the one or more sub nodes 204a-204d. In some examples, the host 210 can control the peripheral devices 206a-206c via I2C-to-I2C communication. In some embodiments, the host 210 can use an SPI control bus to access registers and status information for the one or more sub nodes 204a-204d. In some examples, the host 210 can control the peripheral devices 206a-206c via SPI-to-SPI or SPI-to-I2C communication. In some examples, the two-wire communication system 200 is in a vehicle.

In various examples, the main node 202 may generate downstream signals and receive upstream signals. Downstream signals can include data signals, power signals, and other signals transmitted away from the main node 202 along the bus 212. Upstream signals can include signals transmitted toward the main node 202 along the bus 212. The main node 202 may provide a clock signal for synchronous data transmission over the bus 212. Synchronous data may include data streamed continuously (e.g., audio signals) with a fixed time interval between two successive transmissions to/from the same node along the bus 212. A sub node 204a-204d may be an addressable network connection point that represents a possible destination for data frames transmitted downstream on the bus 212 or upstream on the bus 212. A sub node 204a-204d may also represent a possible source of downstream or upstream data frames. The system 200 may allow for control information and other data to be transmitted in both directions over the bus 212 from one node to the next.

In various examples, the peripheral devices 206a-206e can include various hardware, such as one or more of microphones or speakers. In some examples, the sub nodes 204a-204d can include an audio mixer, a digital signal processor (DSP), an amplifier, a filter, a codec, a cellular NAD, or other hardware. In one implementation, the host 210 is a digital signal processor, the main node 202 is an acoustic integration module, the first sub node 204a is a Cabin Sound Module (CSM), the second sub node 204b is a primary Integrated Display Control Module (IDCM), the third sub node 204c is a secondary IDCM, and the fourth sub node 204e is a customer facing WIFI module (CFWM). In various examples, each of the nodes can be coupled to one or more peripheral devices 204a-204e. In some examples, one or more nodes 202, 204a-204d is not coupled to a peripheral device. In various examples, data from one node 202, 204a-204d can be transmitted to a second node 202, 204a-204d, where the data is processed and then transmitted to a third node 202, 204a-204d, and so on. For instance, audio data can be received at multiple microphones, transmitted to a first node for noise cancellation and beamforming, and the filtered beamformed audio data can be transmitted to a second node for mixing.

Figure 3:
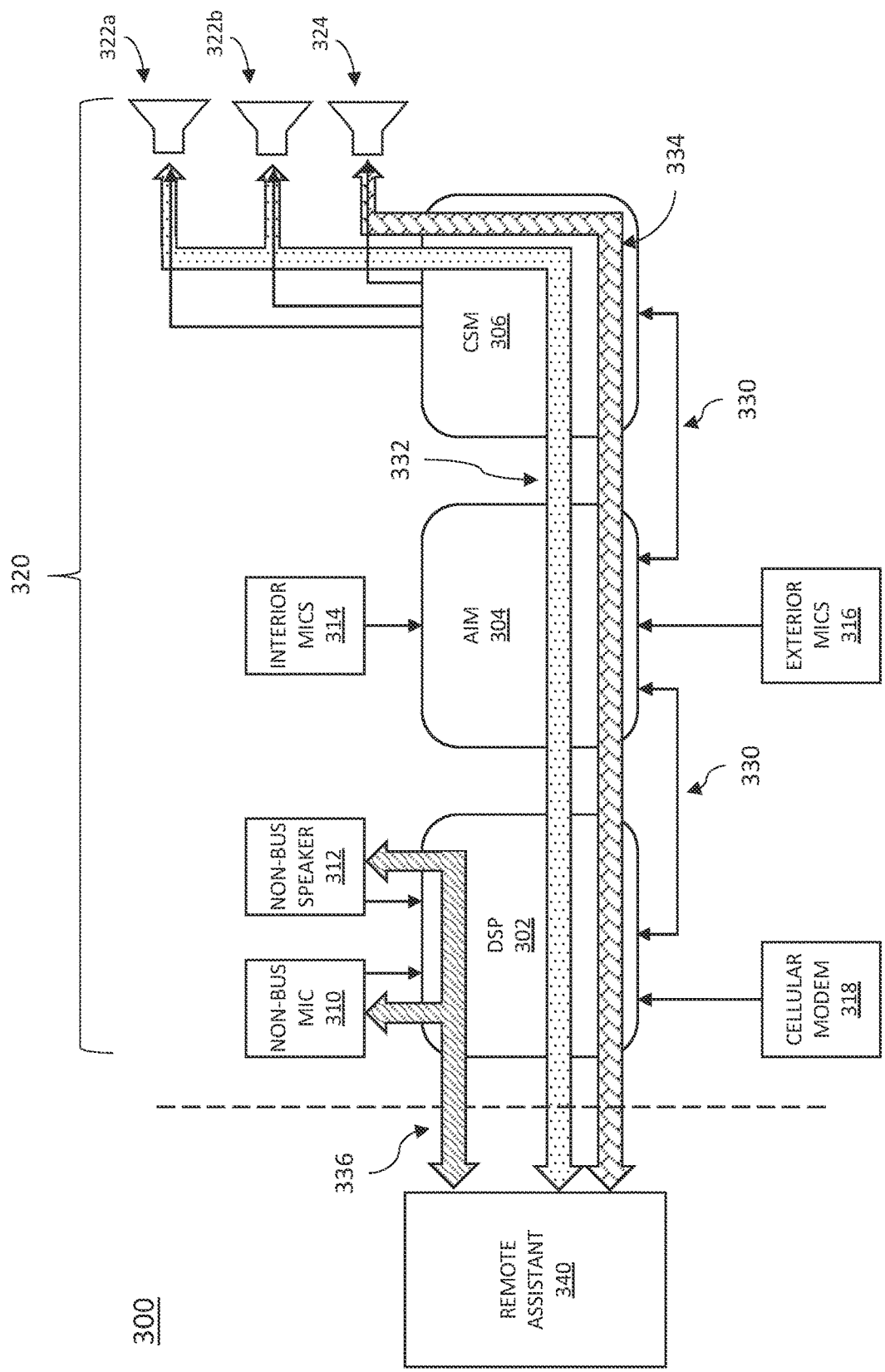
FIG. 3 is a block diagram of a vehicle bus network system showing various vehicle components connected to the vehicle network bus, according to some examples of the present disclosure.

FIG. 3 is block diagram 300 of a vehicle bus network system 320 showing various vehicle components connected to the vehicle network bus 330, according to some examples of the present disclosure. In particular, FIG. 3 shows a network bus system 320 including a digital signal processor (DSP) node 302, an acoustic integration module (AIM) node 304, and a CSM node 306. The DSP node 302 can be a Telemetrics and Networking Gateway (TANG) DSP, and the DSP 302 is connected to a non-bus microphone 310 and a non-bus speaker 312. Additionally, in various examples, the DSP node 302 can be connected to one or more cellular connection modules, such as a cellular modem 318. The AIM node 304 is connected to interior vehicle bus microphones 314 and exterior vehicle bus microphones 316. The CSM node 306 is coupled to interior vehicle bus speakers 322a, 322b, and an exterior vehicle bus speaker 324.

In some examples, a vehicle includes multiple interior microphones 314 for each seat. For instance, a vehicle can include four bus microphones 314 for each seat in the vehicle, such that a vehicle having six seats includes twentyfour interior vehicle bus microphones 314. In some examples, the AIM node 304 filters the signals from the interior bus microphones bus 314 with a noise reduction filter to reduce noise in the microphone signals. Additionally, in some examples, the AIM node 304 beamforms the signals from selected microphones for each seat in the vehicle. Thus, for instance, the AIM node 304 beamforms four interior bus microphone signals for each seat, resulting in six beamformed signals. Similarly, the AIM node 304 filters noise from the exterior bus microphones 316 with a noise reduction filter to reduce noise in the exterior bus microphone signals, and the AIM node 304 can beamform exterior bus microphone signals. The AIM node 304 transmits the filtered, beamformed audio signals via the audio bus 330 to the DSP node 302. In some examples, the AIM node 304 transmits the filtered, beamformed audio signals to one or more other nodes for processing before the audio signals are received at the DSP node 302.

In some implementations, the vehicle bus network 320 includes additional nodes, and in some examples, the vehicle bus network 320 includes a mixer node. In some examples, a mixer node can receive the six beamformed interior bus microphone signals from the AIM node 304, mix the six beamformed interior bus signals into one mixed interior bus microphone signal, and transmit the mixed interior bus microphone signal over the audio bus 330 to the DSP node 302. In some examples, an integrated display control module (IDCM) node receives the six beamformed interior bus microphone signals from the AIM node 304, mixes the six beamformed interior bus microphone signals, and transmits the mixed interior bus microphone signal over the audio bus 330 to the DSP node 302. The DSP node can connect to a cellular modem 318 and transmit the mixed interior bus microphone signal to a remote assistant 340. Similarly, filtered beamformed signals from exterior bus microphones 316 can be transmitted over the network bus 330 to one or more other nodes and to the DSP node 302 for transmission to the remote assistant 340.

In addition to transmitting audio signals, the bus network system 320 can receive audio signals, for example from the remote assistant 340. In various examples, a vehicle includes multiple interior speakers 322a, 322b, as well as one or more exterior speakers 324. The speakers 322a, 322b, 324 are connected to the CSM node 306. In some examples, the CSM node 306 includes one or more of a filter and a mixer. The CSM node 306 can also include a chime production module for generating a chime and/or ring tone to indicate a call or audio connection. Audio can be received at the DSP node 302, and transmitted via the audio bus 330 to the CSM node 306. The CSM node 306 processes the received audio signal and then plays the received audio on one or more of the speakers 322a, 322b, 324. In some examples, audio received at the DSP node 302 is transmitted via the audio bus 330 to an IDCM node (not shown) for echo cancellation and noise reduction, and the filtered received audio is transmitted from the IDCM node via the network bus 330 to the CSM node 306.

The system 300 also includes a remote assistant 340. The remote assistant can be a human assistant that is remote from the vehicle. Calls between the remote assistant 340 and the vehicle are typically transmitted over a cellular modem 318 via the DSP node 302. According to various implementations, the DSP node 302 can connect the audio communications to bus microphones 314, 316 and bus speakers 322a, 322b, 324 via the audio bus 330. The arrow 332 in FIG. 3 illustrates the connection between the remote assistant 340 and the vehicle interior speakers 322a, 322b via the audio bus 330. Similarly, the arrow 334 in FIG. 3 illustrates the connection between the remote assistant 340 and the vehicle exterior speaker 324 via the audio bus 330.

Because the various audio processing components are connected via the audio bus, any fault on the audio bus can result in audio loss, including loss of audio transmissions and loss of audio reception. Thus, the DSP 302 is connected to a non-bus microphone 310 and a non-bus speaker, which can be used to connect with the remote assistant in the case of an audio bus fault and/or failure. Thus, in the case of a fault on the audio bus 330, the DSP node 302 can connect the audio communications with the non-bus microphone 310 and the non-bus speaker 312, using the cellular modem 318. In various examples, the audio quality of a call connected to the non-bus microphone and non-bus speaker 312 is inferior to the audio quality of a call connected via the audio bus 330 to the bus microphones 314, 316 and the bus speakers 322a, 322b, 324. The arrow 336 illustrates the connection between the remote assistant 340 and the non-bus microphone 310 and non-bus speaker 312, via the DSP node 302.

Figure 4A:
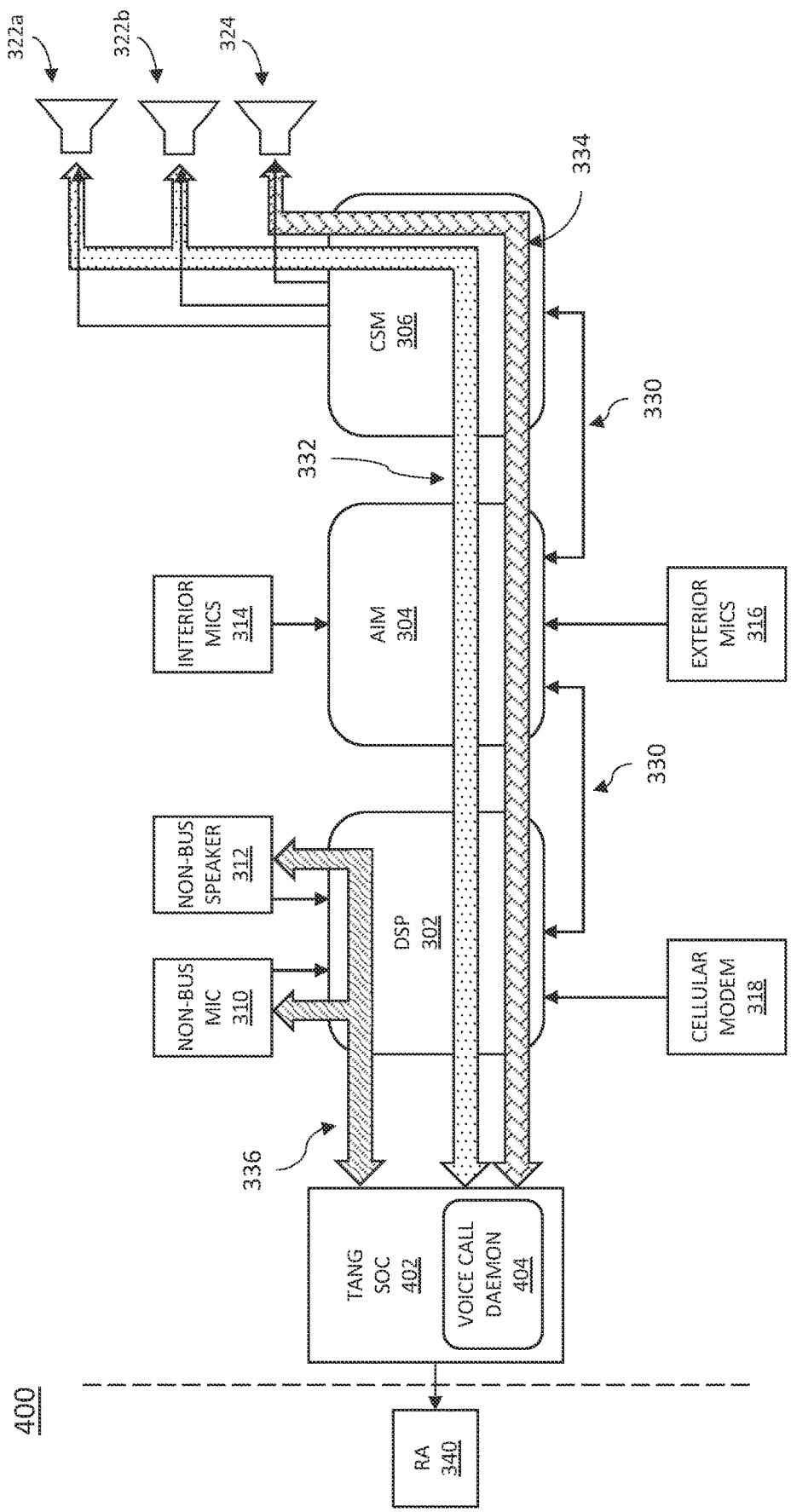
FIGS. 4A and 4B are block diagrams of the vehicle bus network system and additional components, according to some examples of the present disclosure.
Figure 4B:
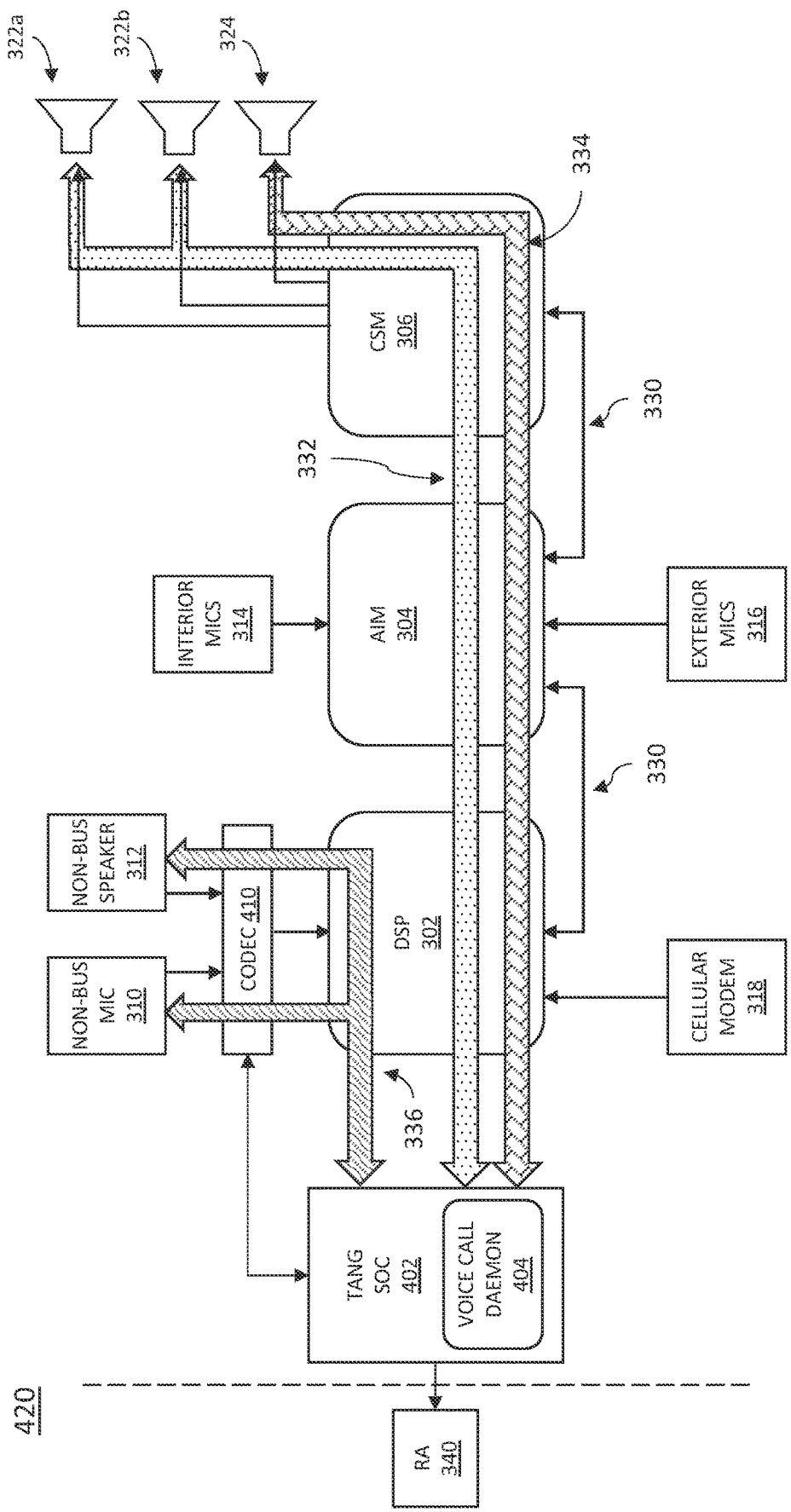

FIGS. 4A and 4B are block diagrams 400, 420 of the vehicle bus network system 320 and additional components, according to some examples of the present disclosure. In particular, FIG. 4A shows the network bus system 320 as described above with respect to FIG. 3 connected to a TANG (Telemetrics and Networking Gateway) chip 402. The TANG chip 402 can be an integrated circuit, and the TANG chip 402 can be a system on a chip. The TANG chip 402 can be a bus managing module, which monitors the audio bus. The TANG chip 402 can include one or more drivers, operating systems, libraries, software components, and/or other components. In various examples, the TANG chip 402 can be connected to the audio bus 330, and the TANG chip 402 can connect with the remote assistant 340. In various examples, the TANG chip 402 is connected to various components of the bus network system 320 via one or more of an I2C connection, D-Bus (an Inter Process Communication (IPC) mechanism), and GPIO (General Purpose Input/Output). The TANG chip 402 includes a voice call daemon 404, which can detect a fault on the audio bus 330 and automatically route audio communications to the non-bus microphone 310 and non-bus speaker 312. In some examples, the voice call daemon 404 can switch calls from the audio bus 330 to the non-bus microphone 310 and non-bus speaker 312 when it detects a fault. In various examples, as shown in FIG. 4A, the components to the right of the dashed line are components installed on a vehicle.

In various examples, the voice call daemon 404 constantly monitors the audio bus 330. In some examples, the voice call daemon 404 periodically sends a superframe along the audio bus 330 and receives the return superframe. Changes in the superframe can indicate a fault in the audio bus. Additionally, delays in the return superframe can indicate a fault on the audio bus. In some examples, if a supreframe transmitted by the daemon 404 over the audio bus 330 has not returned within 250 ms, the daemon 404 concludes there is an audio bus fault. In some examples, the superframe is a part of a call on the audio bus 330. In some examples, the superframe is separate from a call on the audio bus 330 and is transmitted for testing the audio bus 330. When the daemon 404 detects a fault, daemon 404 and/or the TANG chip 402 can instruct the DSP 302 to switch the input source from the vehicle bus microphones 314, 316 to the non-bus microphone 310, and to switch the output source form the vehicle speakers 322a, 322b, 324 to the non-bus speaker 312.

FIG. 4B shows a network system 420, which includes the network system described with respect to FIG. 4A and further includes a codec 410 connected to the non-bus microphone 310, the non-bus speaker 312, and the DSP 302. In some examples, the codec 410 is between the DSP node 302 and the microphone 310 and the non-bus speaker 31, such that the codec 410 is connected to the DSP 302, and the non-bus microphone 310 and non-bus speaker 312 are connected to the DSP 302 via the codec 410. The codec 410 can also be connected to the TANG chip 402. In some examples, the codec 410 encodes the audio signal to generate an encoded signal for transmission over a cellular network, for instance using TANG.

According to various examples, the cellular modem 318 includes multiple cellular modems, and each cellular modem can transmit signals over a different network. In some examples, the DSP node 302 supports two cellular modem signals, and the system includes three cellular modems and a mixer to mix two of the cellular modem signals resulting in two inputs to the DSP 302.

In various examples, any of the components on the audio bus 330 can be configured to communicate with the TANG chip 402 via the audio bus 330 and via the DSP node 302. In some examples, the Aim node 304 and/or the CSM node 306 can be configured to transmit messages to the TANG chip 402 or otherwise communicate with the TANG chip 402.

There are many different things that can cause a fault on the bus network system 320. For example, a microphone part can wear out, or a microphone connection can wear out. A node, such as the AIM node 304, can run software to perform various functions and the node can experience a software failure. In some examples, if the audio bus 330 fails, the TANG chip 402 detects the bus failure. Similarly, if software running on an audio bus node fails, this results in a change in the data on the audio bus, which can be detected by the TANG chip 402. In some examples, e.g., when audio quality is poor, a remote assistant 340 can transmit a message or instruction to switch the audio source from the audio bus to the non-bus microphone 310 and non-bus speaker 312. In some examples, an onboard computer can detect an audio quality issue other than an audio bus fault and switch the call and corresponding audio connection from the audio bus to a non-bus microphone and non-bus speaker. The audio quality issue can be, for example, a beamforming failure, such that multiple input audio streams are not correctly beamformed. In some examples, sensor data can be used to detect an audio quality issue.

In some examples, as discussed above, the AIM node 304 outputs multiple beamformed input audio streams, and one or more of the multiple streams can have an issue. If one or more of the beamformed input audio streams are functioning well, the system can use the other input audio streams to improve and/or replace the audio stream that has an issue.

Method for a Vehicle Audio Bus Failure

Figure 5:
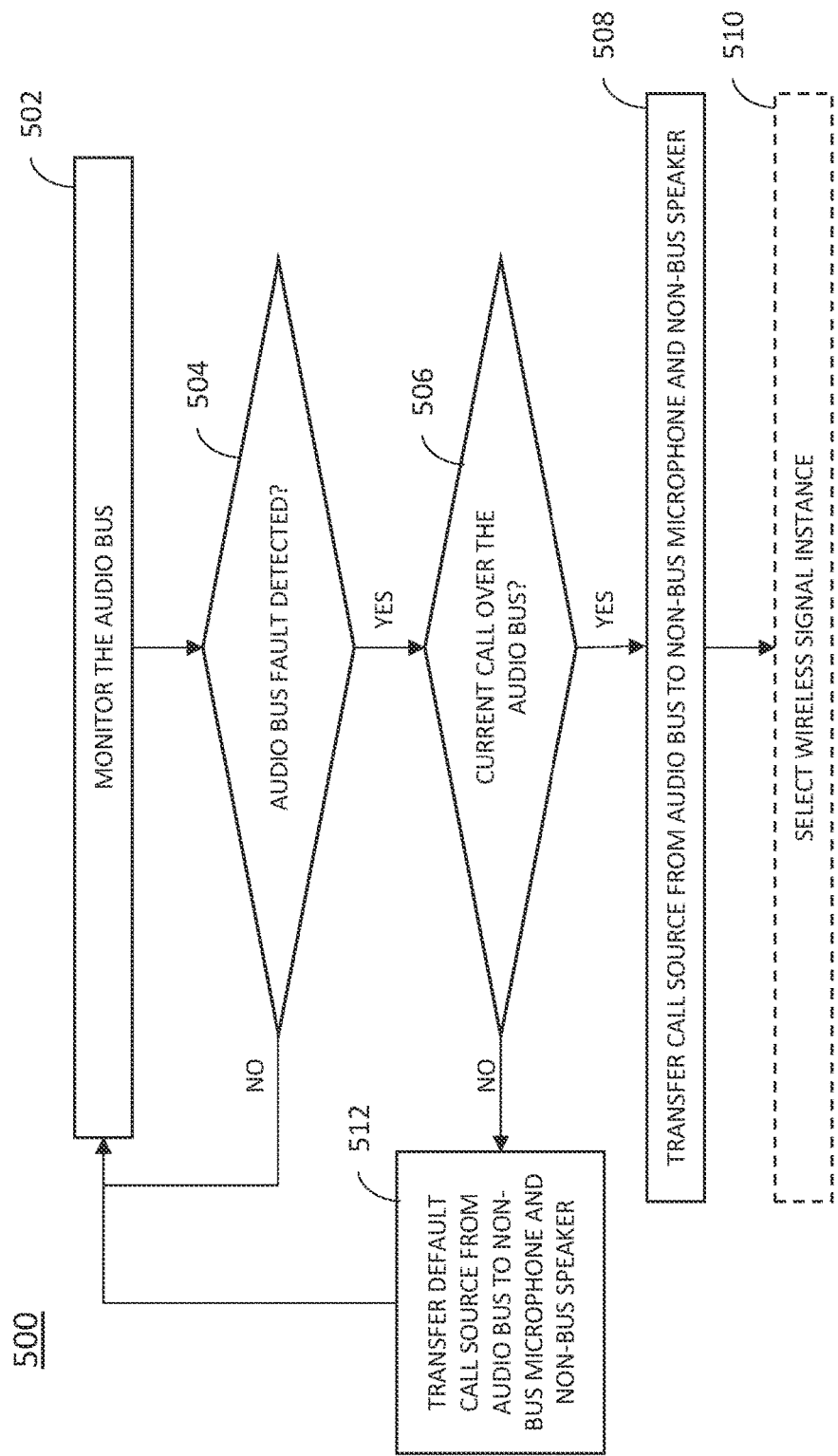
FIG. 5 is a flow chart of a method for preventing loss of audio during calls from a vehicle when the audio bus fails, according to some examples of the present disclosure, according to some examples of the present disclosure.

FIG. 5 is a flow chart of a method 500 for preventing loss of audio during calls from a vehicle when the audio bus fails, according to some examples of the present disclosure. At step 502, the audio bus is monitored. In particular, a bus managing module, such as a TANG system on a chip can monitor the audio bus. In some examples, the TANG chip includes a daemon module that monitors the audio bus by periodically transmitting one or more frames along the audio bus and receiving corresponding return frames. At step 504, the TANG chip determines whether a fault is detected on the audio bus. In particular, the daemon module can identify an audio bus fault if the one or more transmitted frames is not received back within a selected period of time. In various examples, the selected period of time is less than one second, and the selected period of time can be 100 ms, 250 ms, or 500 ms. Additionally, in some implementations, the daemon module can detect an audio bus fault based on the returned frames received back at the daemon module. In particular, if the returned frames are partially corrupted or otherwise indicate a transmission issue, the daemon module can conclude there is an audio bus fault. As discussed above, an audio bus fault can be a fault in any connection along the audio bus, in any peripheral device, and/or in any node along the audio bus.

At step 504, if no fault is detected, the method 500 returns to step 502. At step 504, if a fault is detected, the method 500 proceeds to step 506. At step 506, it is determined whether there is a current audio communication between the vehicle and an exterior source, such as a call between a vehicle occupant and a remote assistant, or a call between emergency personnel and a remote assistant. If there is no current audio communication or call underway, the method 500 can proceed to step 512 and create a default setting for future calls to be routed through a non-bus microphone and non-bus speaker until the fault is fixed, and the method 500 can return to step 502 and continue to monitor the audio bus in case the audio bus fault resolves itself.

If, at step 506, there is a current audio communication or call occurring when the audio bus fault is detected, the method 500 proceeds to step 508. At step 508, the audio communication source is transferred from the audio bus microphones and audio bus speakers to the non-bus microphone and the non-bus speaker. In various examples, the TANG chip transfers the audio sources during the call automatically, and there is minimal to no downtime during which the person in or at the vehicle and the remote party are not in communication. In particular, there is no manual request (button press or action by a remote assistant) to transfer the call to the non-bus microphone and speaker. Instead, when the daemon module running on the TANG chip detects the audio bus fault during the call, the daemon module and the TANG chip automatically transfer the call to the non-bus microphone and non-bus speaker.

Optionally, at step 510, the wireless signal instance can be selected. In particular, in some implementations, a vehicle can have multiple cellular modems, each connected to a different cellular network, and the TANG chip can evaluate the network connections and select a cellular modem for the call, thereby selecting a wireless signal instance.

In some implementations, a fault on the audio bus can be detected using other vehicle sensors. For example, it can be determined from a video stream from vehicle image sensors that a passenger is talking, and there is no detection of a corresponding signal on the audio bus (or corresponding output from the audio bus). In another example the signal from a non-bus microphone can be compared with the audio bus microphone signal to determine if the non-bus signal and the audio bus signal are similar and detect a fault on the audio bus.

Example Autonomous Vehicle (AV) Management System

Figure 6:
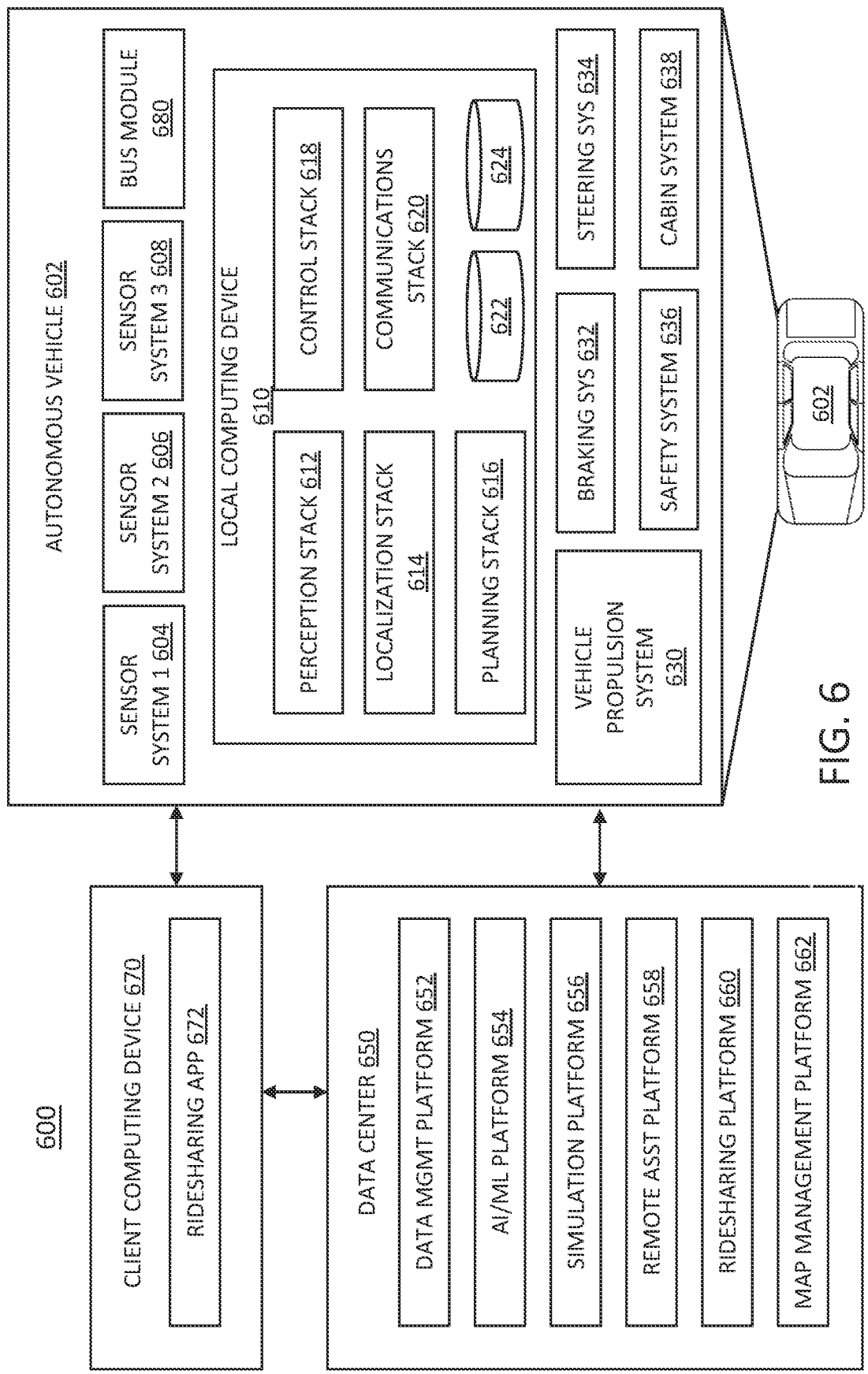
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors. Additionally, in various implementations, as discussed herein, a bus network module 880 can be used to connect various nodes along a network bus, such as an audio bus. Additionally, the bus module 680 can include a bus managing module such as the TANG chip 402 discussed above to monitor the network bus and detect any faults on the network bus.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processing System

Figure 7:
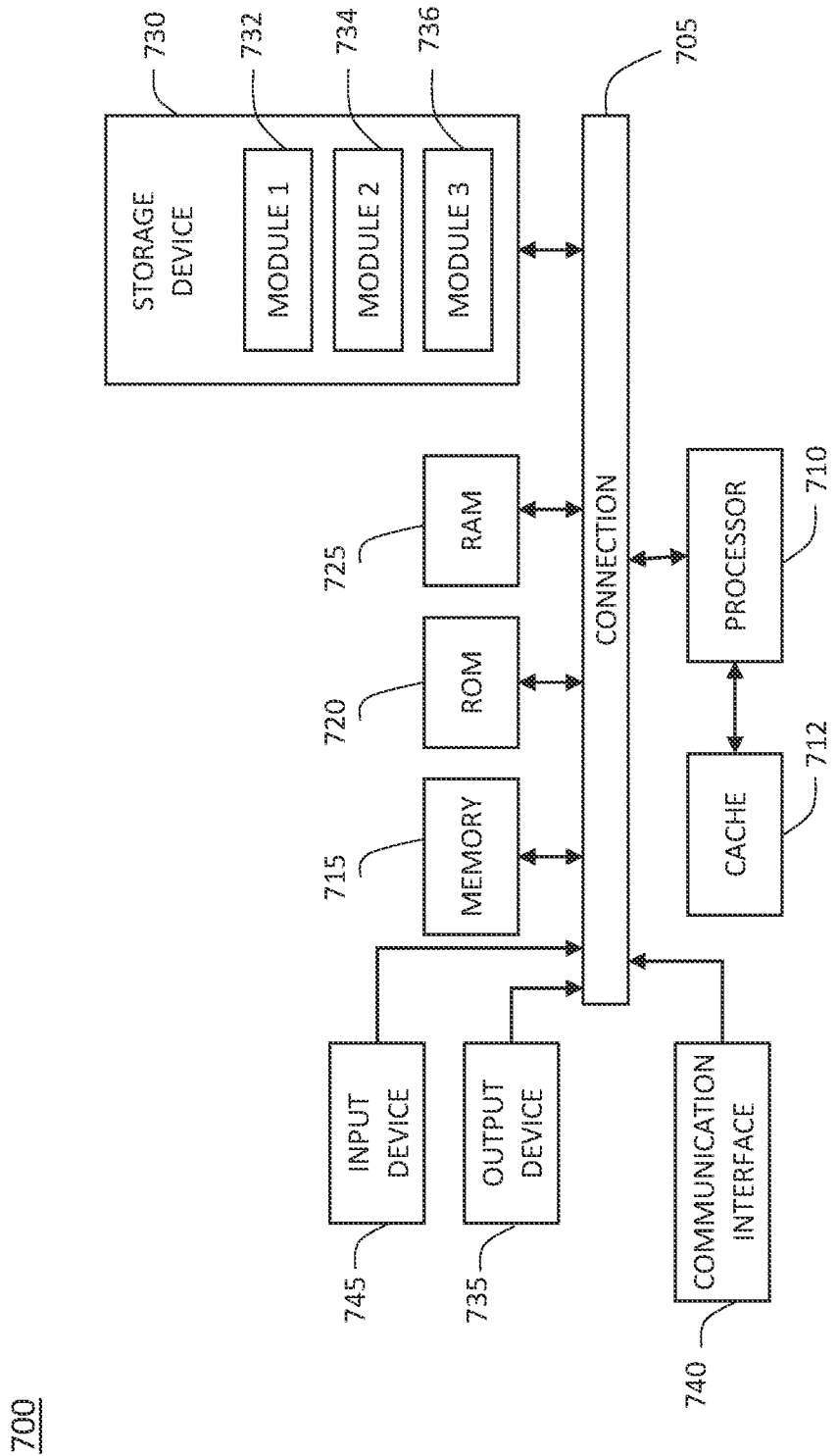
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection. In some examples, the connection 705 can be a network bus connection. In various examples, bus managing module to monitor a network bus and detect a fault on the bus can be added to a system such as the system 700 that include a network bus.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a system for preventing audio loss during a vehicle call, comprising: an audio bus configured to connect a plurality of nodes in a vehicle; a plurality of vehicle microphones, each vehicle microphone connected to a first node of the plurality of nodes; a plurality of vehicle speakers, each vehicle speaker connected to a second node of the plurality of nodes; a processor configured to receive data from the plurality of nodes via the audio bus; a non-bus microphone, wherein the non-bus microphone is coupled to the processor; a non-bus speaker, wherein the non-bus speaker is coupled to the processor; a cellular module connected to the processor, wherein the cellular module is configured to connect a call from the processor to a call recipient; and a bus managing module coupled to the processor, wherein the bus managing module is configured to detect a fault on the audio bus and switch the call and a corresponding audio connection from the audio bus to the non-bus microphone and the non-bus speaker.

Example 2 provides a system, method, circuit, computer-readable media, and/or vehicle according to one or more of the preceding and/or following examples, wherein the bus managing module is an integrated circuit, and wherein the bus managing module further comprises a voice call software module configured to monitor the audio bus by transmitting a frame on the audio bus and receiving a corresponding return frame.

Example 3 provides a system, method, circuit, computer-readable media, and/or vehicle according to one or more of the preceding and/or following examples, wherein the voice call software module is configured to detect the fault on the audio bus when the voice call software is still waiting for the corresponding return frame after a selected period of time.

Example 4 provides a system, method, circuit, computer-readable media, and/or vehicle according to one or more of the preceding and/or following examples, wherein the frame includes a plurality of frames and the corresponding return frame includes a plurality of corresponding return frames, and wherein the voice call software module is configured to detect the fault on the audio bus when the voice call software is still waiting for a selected number of the corresponding return frames from the plurality of corresponding return frames after a selected period of time.

Example 5 provides a system, method, circuit, computer-readable media, and/or vehicle according to one or more of the preceding and/or following examples, further comprising a codec coupled to the processor, the non-bus microphone, the non-bus speaker, and the bus managing module, wherein the codec is configured to encode non-bus microphone data and decode non-bus speaker data.

Example 6 provides a system, method, circuit, computer-readable media, and/or vehicle according to one or more of the preceding and/or following examples, wherein the codec is connected to the bus managing module via an I2C connection.

Example 7 provides a system, method, circuit, computer-readable media, and/or vehicle according to one or more of the preceding and/or following examples, wherein the bus managing module is configured to switch the call and the corresponding audio connection by transmitting a signal to the processor instructing the processor to: switch a processor audio input source from the audio bus to the non-bus microphone, and switch a processor audio output source from the audio bus to the non-bus speaker.

Example 8 provides a system, method, circuit, computer-readable media, and/or vehicle according to one or more of the preceding and/or following examples, wherein the plurality of microphones includes a plurality of sets of microphones, wherein the first node is an acoustic integration module configured to beamform signals from each set of microphones to generate a plurality of beamformed signals, and further comprising a mixer configured to mix each of the plurality of beamformed signals.

Example 9 provides a system, method, circuit, computer-readable media, and/or vehicle according to one or more of the preceding and/or following examples, wherein the audio bus includes a plurality of two-wire bus links between adjacent nodes of the plurality of nodes, connecting the plurality of nodes in a daisy-chain.

Example 10 provides a method for preventing audio loss during a vehicle call, comprising: providing an audio bus connecting a plurality of nodes in a vehicle; providing a plurality of vehicle microphones, each vehicle microphone connected to a first node of the plurality of nodes; providing a plurality of vehicle speakers, each vehicle speaker connected to a second node of the plurality of nodes; providing a processor configured to receive data from the plurality of nodes via the audio bus; monitoring the audio bus with a bus managing module coupled to the processor; detecting a fault on the audio bus; determining there is an audio connection over the audio bus between the vehicle and a remote assistant, wherein the audio connection is utilizing the plurality of vehicle microphones for audio input, and wherein the audio connection is utilizing the plurality of vehicle speakers for audio output; and transferring the audio connection between the vehicle and the remote assistant off the audio bus by switching the audio input to a non-bus microphone and switching the audio output to a non-bus speaker.

Example 11 provides a system, method, circuit, computer-readable media, and/or vehicle according to one or more of the preceding and/or following examples, wherein monitoring the audio bus includes transmitting a frame on the audio bus and receiving a corresponding return frame.

Example 12 provides a system, method, circuit, computer-readable media, and/or vehicle according to one or more of the preceding and/or following examples, wherein detecting the fault on the audio bus includes identifying the fault when voice call software in the bus managing module is still waiting for the corresponding return frame after a selected period of time.

Example 13 provides a system, method, circuit, computer-readable media, and/or vehicle according to one or more of the preceding and/or following examples, wherein the frame includes a plurality of frames and the corresponding return frame includes a plurality of corresponding return frames, and wherein detecting the fault on the audio bus includes identifying the fault when voice call software in the bus managing module is still waiting for a selected number of the corresponding return frames from the plurality of corresponding return frames after a selected period of time.

Example 14 provides a system, method, circuit, computer-readable media, and/or vehicle according to one or more of the preceding and/or following examples, further comprising selecting, by the processor, a cellular modem network connection for the audio connection.

Example 15 provides a vehicle for preventing audio loss during a call, comprising a plurality of vehicle microphones, each vehicle microphone connected to an acoustic integration module; a plurality of vehicle speakers, each vehicle speaker connected to a cabin sound node; an audio bus configured to connect a plurality of nodes via a plurality of two-wire bus links, wherein a first node of the plurality of nodes is the acoustic integration module and a second node of the plurality of nodes is the cabin sound node; a non-bus microphone; a non-bus speaker; and an onboard computer, comprising: a processor configured to receive data from the plurality of nodes via the audio bus; a cellular module configured to connect a call from the processor to a call recipient; and a bus managing module, wherein the bus managing module is configured to detect a an audio quality issue and switch the call and a corresponding audio connection from the audio bus to the non-bus microphone and the non-bus speaker.

Example 16 provides a system, method, circuit, computer-readable media, and/or vehicle according to one or more of the preceding and/or following examples, wherein the bus managing module is an integrated circuit, and wherein the bus managing module further comprises a voice call software module configured to monitor the audio bus by transmitting a frame on the audio bus and receiving a corresponding return frame.

Example 17 provides a system, method, circuit, computer-readable media, and/or vehicle according to one or more of the preceding and/or following examples, wherein the voice call software module is configured to detect the fault on the audio bus when the voice call software is still waiting for the corresponding return frame after a selected period of time.

Example 18 provides a system, method, circuit, computer-readable media, and/or vehicle according to one or more of the preceding and/or following examples, wherein the frame includes a plurality of frames and the corresponding return frame includes a plurality of corresponding return frames, and wherein the voice call software module is configured to detect the fault on the audio bus when the voice call software is still waiting for a selected number of the corresponding return frames from the plurality of corresponding return frames after a selected period of time.

Example 19 provides a system, method, circuit, computer-readable media, and/or vehicle according to one or more of the preceding and/or following examples, wherein the processor is coupled to the non-bus microphone and the non-bus speaker.

Example 20 provides a system, method, circuit, computer-readable media, and/or vehicle according to one or more of the preceding and/or following examples, wherein the bus managing module is configured to switch the call and the corresponding audio connection by transmitting a signal to the processor instructing the processor to: switch a processor audio input source from the audio bus to the non-bus microphone, and switch a processor audio output source from the audio bus to the non-bus speaker.

Example 21 provides a system, method, circuit, computer-readable media, and/or vehicle according to one or more of the preceding and/or following examples, further comprising at least one sensor configured to generate sensor data, wherein the bus managing module is configured to detect the audio quality issue based on the sensor data.

Example 22 provides a system, method, circuit, computer-readable media, and/or vehicle according to one or more of the preceding and/or following examples, wherein the bus managing module is configured to detect one of a beamforming failure for signals received at the plurality of microphones.

Example 23 provides one or more non-transitory computer-readable media storing instructions executable to perform operations, the operations comprising monitoring the audio bus with a bus managing module, wherein the audio bus connects a plurality of nodes in a vehicle, wherein the bus managing module is coupled to a processor, and wherein the processor is configured to receive data from the plurality of nodes via the audio bus; detecting a fault on the audio bus; determining there is an audio connection over the audio bus between the vehicle and a remote assistant, wherein the audio connection is utilizing a plurality of vehicle microphones for audio input, wherein each vehicle microphone of the plurality of vehicle microphones is connected to a first node of the plurality of nodes on the audio bus, and wherein the audio connection is utilizing a plurality of vehicle speakers for audio output, wherein each vehicle speaker of the plurality of vehicle speakers is connected to a second node of the plurality of nodes on the audio bus; and transferring the audio connection between the vehicle and the remote assistant off the audio bus by switching the audio input to a non-bus microphone and switching the audio output to a non-bus speaker.

Example 24 provides z method comprising monitoring the audio bus with a bus managing module, wherein the audio bus connects a plurality of nodes in a vehicle, wherein the bus managing module is coupled to a processor, and wherein the processor is configured to receive data from the plurality of nodes via the audio bus; detecting a fault on the audio bus; determining there is an audio connection over the audio bus between the vehicle and a remote assistant, wherein the audio connection is utilizing a plurality of vehicle microphones for audio input, wherein each vehicle microphone of the plurality of vehicle microphones is connected to a first node of the plurality of nodes on the audio bus, and wherein the audio connection is utilizing a plurality of vehicle speakers for audio output, wherein each vehicle speaker of the plurality of vehicle speakers is connected to a second node of the plurality of nodes on the audio bus; and transferring the audio connection between the vehicle and the remote assistant off the audio bus by switching the audio input to a non-bus microphone and switching the audio output to a non-bus speaker.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for preventing audio loss during a vehicle call, comprising:
   an audio bus configured to connect a plurality of nodes in a vehicle;
   a plurality of vehicle microphones, each vehicle microphone connected to a first node of the plurality of nodes;
   a plurality of vehicle speakers, each vehicle speaker connected to a second node of the plurality of nodes;
   a processor configured to receive data from the plurality of nodes via the audio bus;
   a non-bus microphone, wherein the non-bus microphone is coupled to the processor;
   a non-bus speaker, wherein the non-bus speaker is coupled to the processor;
   a cellular module connected to the processor, wherein the cellular module is configured to connect a call initiated by the processor to a call recipient; and
   a bus managing module coupled to the processor, wherein the bus managing module is configured to detect a fault on the audio bus and switch the call and a corresponding audio connection from the audio bus to the non-bus microphone and the non-bus speaker in response to detecting the fault on the audio bus.

2. The system of claim 1, wherein the bus managing module is an integrated circuit, and wherein the bus managing module further comprises a voice call software module configured to monitor the audio bus by transmitting a frame on the audio bus and receiving a corresponding return frame.

3. The system of claim 2, wherein the voice call software module is configured to detect the fault on the audio bus when the voice call software is still waiting for the corresponding return frame after a selected period of time.

4. The system of claim 2, wherein the frame includes a plurality of frames and the corresponding return frame includes a plurality of corresponding return frames, and wherein the voice call software module is configured to detect the fault on the audio bus when the voice call software is still waiting for a selected number of the corresponding return frames from the plurality of corresponding return frames after a selected period of time.

5. The system of claim 1, further comprising a codec coupled to the processor, the non-bus microphone, the non-bus speaker, and the bus managing module, wherein the codec is configured to encode non-bus microphone data and decode non-bus speaker data.

6. The system of claim 5, wherein the codec is connected to the bus managing module via an I2C connection.

7. The system of claim 6, wherein the bus managing module is configured to switch the call and the corresponding audio connection by transmitting a signal to the processor instructing the processor to:
switch a processor audio input source from the audio bus to the non-bus microphone, and
switch a processor audio output source from the audio bus to the non-bus speaker.

8. The system of claim 1, wherein the plurality of vehicle microphones includes a plurality of sets of microphones, wherein the first node is an acoustic integration module configured to beamform signals from each set of microphones to generate a plurality of beamformed signals, and further comprising a mixer configured to mix each of the plurality of beamformed signals.

9. The system of claim 8, wherein the audio bus includes a plurality of two-wire bus links between adjacent nodes of the plurality of nodes, connecting the plurality of nodes in a daisy-chain.

10. A method for preventing audio loss during a vehicle call, comprising:
monitoring the audio bus with a bus managing module, wherein the audio bus connects a plurality of nodes in a vehicle, wherein the bus managing module is coupled to a processor, and wherein the processor is configured to receive data from the plurality of nodes via the audio bus;
detecting a fault on the audio bus;
determining there is an audio connection over the audio bus between the vehicle and a remote assistant,
wherein the audio connection is utilizing a plurality of vehicle microphones for audio input, wherein each vehicle microphone of the plurality of vehicle microphones is connected to a first node of the plurality of nodes on the audio bus, and
wherein the audio connection is utilizing a plurality of vehicle speakers for audio output, wherein each vehicle speaker of the plurality of vehicle speakers is connected to a second node of the plurality of nodes on the audio bus; and
transferring the audio connection between the vehicle and the remote assistant off the audio bus by switching the audio input to a non-bus microphone and switching the audio output to a non-bus speaker.

11. The method of claim 10, wherein monitoring the audio bus includes transmitting a frame on the audio bus and receiving a corresponding return frame.

12. The method of claim 11, wherein detecting the fault on the audio bus includes identifying the fault when voice call software in the bus managing module is still waiting for the corresponding return frame after a selected period of time.

13. The method of claim 11, wherein the frame includes a plurality of frames and the corresponding return frame includes a plurality of corresponding return frames, and wherein detecting the fault on the audio bus includes identifying the fault when voice call software in the bus managing module is still waiting for a selected number of the corresponding return frames from the plurality of corresponding return frames after a selected period of time.

14. The method of claim 10, further comprising selecting, by the processor, a cellular modem network connection for the audio connection.

15. A vehicle for preventing audio loss during a call, comprising
a plurality of vehicle microphones, each vehicle microphone connected to an acoustic integration module;
a plurality of vehicle speakers, each vehicle speaker connected to a cabin sound node;
an audio bus configured to connect a plurality of nodes via a plurality of two-wire bus links, wherein a first node of the plurality of nodes is the acoustic integration module and a second node of the plurality of nodes is the cabin sound node;
a non-bus microphone;
a non-bus speaker; and
an onboard computer, comprising:
a processor configured to receive data from the plurality of nodes via the audio bus;
a cellular module configured to connect a call to a call recipient; and
a bus managing module, wherein the bus managing module is configured to detect an audio quality issue and switch the call and a corresponding audio connection from the audio bus to the non-bus microphone and the non-bus speaker.

16. The vehicle of claim 15, wherein the bus managing module is an integrated circuit, and wherein the bus managing module further comprises a voice call software module configured to monitor the audio bus by transmitting a frame on the audio bus and receiving a corresponding return frame.

17. The vehicle of claim 16, wherein the voice call software module is configured to detect a fault on the audio bus when the voice call software is still waiting for the corresponding return frame after a selected period of time.

18. The vehicle of claim 15, further comprising at least one sensor configured to generate sensor data, wherein the bus managing module is configured to detect the audio quality issue based on the sensor data.

19. The vehicle of claim 15, wherein the bus managing module is configured to detect one of a beamforming failure for signals received at the plurality of vehicle microphones.

20. The vehicle of claim 15, wherein the processor is coupled to the non-bus microphone and the non-bus speaker, and wherein the bus managing module is configured to switch the call and the corresponding audio connection by transmitting a signal to the processor instructing the processor to:
    switch a processor audio input source from the audio bus to the non-bus microphone, and
    switch a processor audio output source from the audio bus to the non-bus speaker.

\* \* \* \* \*